Feb. 7, 1956 H. BÜTTNER 2,733,454
MEANS FOR SECURING THE WINDINGS OF SPRINGS IN MATTRESSES
OR THE LIKE AND METHOD OF MAKING THE SAME
Filed Feb. 12, 1953 3 Sheets-Sheet 1
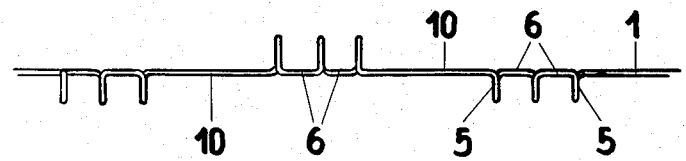
Fig. 1
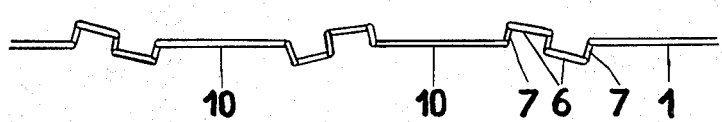
Fig. 2
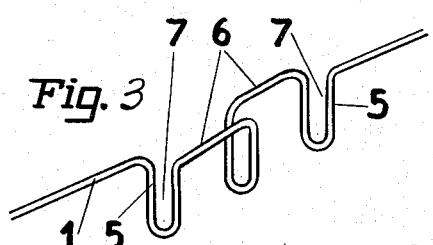
Fig. 3
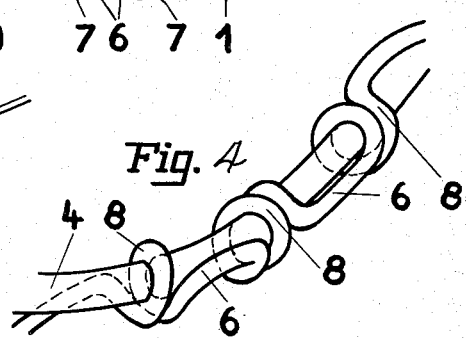
Fig. 4
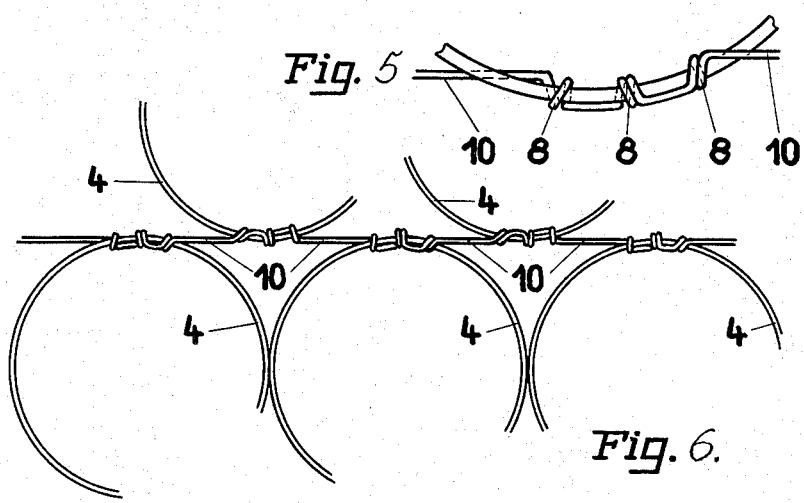
Fig. 5
Fig. 6.
INVENTOR.
Hugo Büttner
BY
ATTORNEY Feb. 7, 1956 H. BÜTTNER 2,733,454
MEANS FOR SECURING THE WINDINGS OF SPRINGS IN MATTRESSES
OR THE LIKE AND METHOD OF MAKING THE SAME
Filed Feb. 12, 1953 3 Sheets-Sheet 2
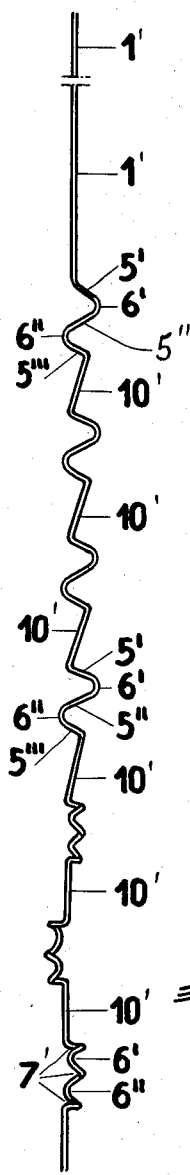
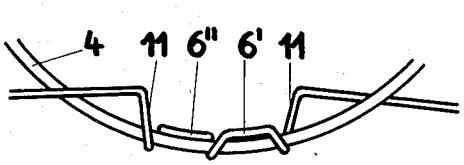
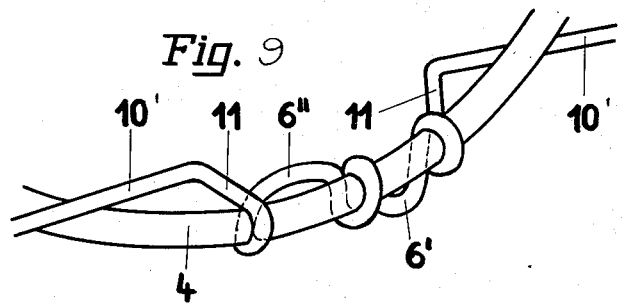
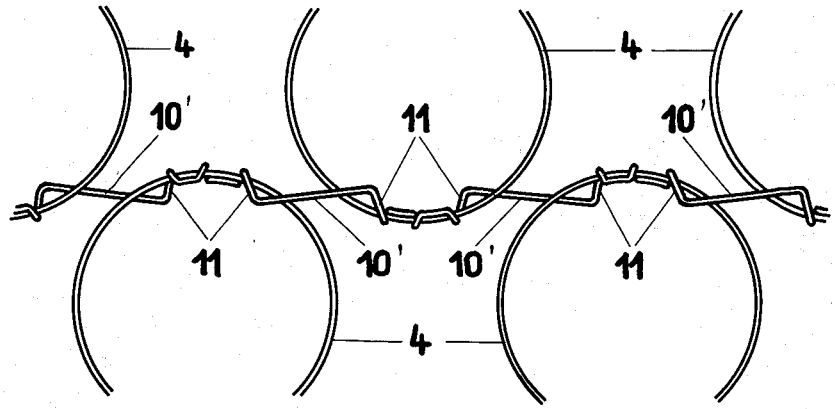
INVENTOR.
Hugo Büttner
BY Ernest Montague
ATTORNEY Feb. 7, 1956 H. BÜTTNER 2,733,454
MEANS FOR SECURING THE WINDINGS OF SPRINGS IN MATTRESSES
OR THE LIKE AND METHOD OF MAKING THE SAME
Filed Feb. 12, 1953 3 Sheets-Sheet 3

INVENTOR.
Hugo Büttner
BY Ernest J Montague
ATTORNEY

---

United States Patent Office 2,733,454
Patented Feb. 7, 1956

---

2,733,454

MEANS FOR SECURING THE WINDINGS OF SPRINGS IN MATTRESSES OR THE LIKE AND METHOD OF MAKING THE SAME

Hugo Büttner, Wuppertal-Vohwinkel, Germany

Application February 12, 1953, Serial No. 336,612

Claims priority, application Germany March 1, 1952

4 Claims. (Cl. 5—273)

The present invention relates to means for connecting the windings of a plurality of springs in a spring assembly by means of a connecting wire for mattresses or the like and to a method of making the same.

The present invention concerns itself particularly with a spring assembly for mattresses or the like, in which a plurality of rows of springs is disposed in such manner that each spring of one row is set off relative to the corresponding spring of the adjacent row and all said springs are interconnected. As a rule helical coil springs are used in such spring assemblies, the diameter of the windings of the springs being smaller at their center than at their ends and their end windings being flat.

It is known to produce such spring assemblies for mattresses, chair upholstering etc. with a plurality of rows of springs connected together in such manner that the windings disposed on the end faces of the individual springs are connected together or interconnected by means of connecting wires.

A wire disposed lengthwise along the rows of springs is usually used, which wire has either preshaped bendings which are reshaped to clamps at the time the connection with the windings of the springs is made, which clamps grip over the windings of the springs.

It is further known to use connecting wires for connection of rows of springs in which the springs of one row are set off relative to the springs of the adjacent rows and which connecting wires are clamped alternately to a spring of one row and another spring of an adjacent row.

It is, therefore, one object of the present invention, to provide a spring assembly comprising a plurality of cylindrical helical springs and in which all windings of the springs are interconnected.

It is known, though, already, to connect all windings of cylindrical springs, including their intermediate windings, by means of special ties. Such connections are, however, complicated and difficult to perform. It is possible only to provide a link-connection and it is necessary to provide springs having alternately right and left windings. The springs are limited in their spring effect due to their short clamping connections and it is impossible to set off the springs in one row relative to those in the adjacent row.

It is another object of the present invention to simplify and to render easier mechanical production of spring assemblies in which the individual springs are disposed in parallel rows, each spring being set off relative to the corresponding spring in the adjacent row, and are connected by means of a wire which connects each pair of adjacent rows of springs, which wire is preshaped to form spaced apart, alternately in opposite directions disposed clamps and to bring about a frameless, solid and silent construction of the spring assemblies by permission of a rigid inner clamping by means of connecting wires.

It is still another object of the present invention to provide a connecting wire for connecting the inclined windings, including the intermediate windings, of the individual cylindrical springs, which wire has a plurality of clamp-mouths which are directed radially from outside towards the spring windings corresponding with their inclination.

This arrangement permits the use of a completely preshaped connecting wire, which can be easily fed to the spring and the clamps of which are directed towards the spring windings and may be closed with conventional tools, which tools may be inserted axially into the springs. The connecting wires which are disposed parallel to each other bring about, in spite of use of thin wires, a highly shape-retaining effect on the spring assembly due to the particular structure of the connecting wires. The windings are connected together by long stemmed wire bridges there between, while the clamps are securely closed and an equalized, soft springing and silent mattress is achieved.

It is yet another object of the present invention to provide a plurality of parallel disposed connecting wires which simplify the assembly, since the wires are carried easily towards the springs disposed in rows, are clamped to the springs by inserting tools into the latter, whereupon a next row of springs may be set in such manner that corresponding springs in the respective adjacent rows are set off each other and the wires then also clamped to the springs of said next row.

It is a still further object of the present invention to provide another embodiment of the wire structure which achieves the inclination of the clamp mouth formed by the wire in simple manner and permits the use of small dimensioned tools for the closing of clamps which end is achieved by an uneven number of legs for each clamp and the S- or Z-shaped bendings of the wires are bent to U-shape to form clamps, so that the outer legs of the clamps are disposed at opposite sides of the median plane through the wire.

It is also a still further object of the present invention to provide a wire structure for the connecting wires for the springs, in which each clamp of the connecting wire has two outer legs and one intermediate leg and two bridge portions connecting the legs and the outer legs, which are bent to U-shape towards one side from their center, are formed to lever arms working on the longitudinal portions of the wire at about a right angle, in order to produce in the connecting wire itself an appreciable spring effect, thereby, increasing the total spring force of the mattress.

In these connections, set in the manner of a turning rod spring effect, it is possible that also the bridge portions of the wire may swing freely upon loading, without engaging, the windings of the spring with creation of noise.

With these and other objects in view which will become apparent in the following detailed description, the present invention will be clearly understood in connection with the accompanying drawings, in which:

Figure 1 is an elevational view of the connecting wire pre-shaped in accordance with the present invention;

Fig. 2 is a plan view thereof;

Fig. 3 is a perspective view of the completely bent clamp in its open position of a connecting wire;

Fig. 4 is a perspective view of the clamp shown in Fig. 3 in its closed position;

Fig. 5 is a plan view of the arrangement shown in Fig. 4;

Fig. 6 is a plan view of a connecting wire showing the connection of the wire with two rows of springs;

Fig. 7 is a plan view of a second embodiment of the connecting wire in which the wire is bent into sine curves;

Fig. 8 is a plan view of a single connection with the second embodiment of the connecting wire;

Fig. 9 is a perspective view of this connection;

Fig. 10 is a plan view of the connecting wire shown in Fig. 7 applied to two rows of coil springs;

Figure 11:
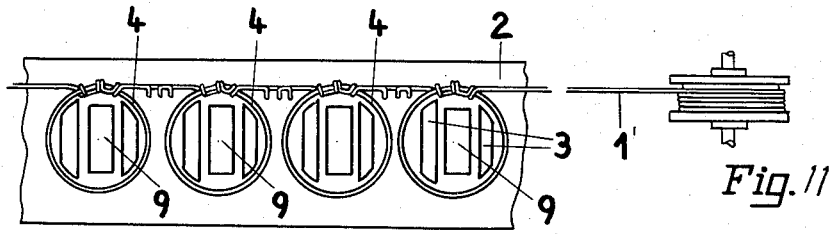
Figs. 11 and 12 are a plan view and elevational view, respectively, of the schematically shown device for performing the connection of the coil springs with the connecting wire in accordance with the present invention.
Figure 12:
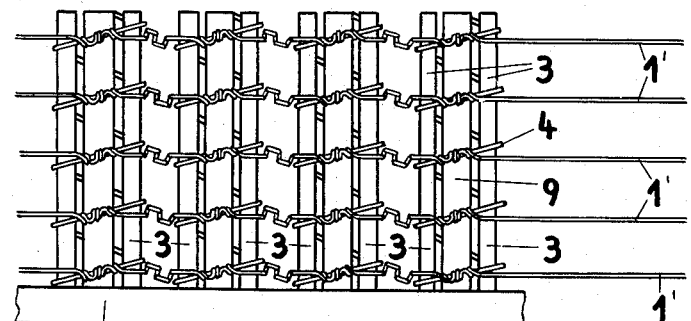

Referring now to the drawings, and in particular to Figs. 1 to 6, the connecting spring wire 1 is equipped with meander-like projections 5, which are shaped by bending their heads 6 to open clamps 7 which are disposed at equal distance in opposite direction in the same plane and have open sides. The mouth opening of the clamp 7 which has an uneven number of legs is, thereby, intermittently displaced in the bending plane, so that the spring coils may be introduced intermittently from opposite directions. Due to the uneven number of legs of the clamp 7, the plane through the clamp mouth extends intermittently rising and falling relative to the axis of the connecting wire. The connecting wire 1 forms the bridges 10 between the clamps 7.

The connection is formed by twining around the spring 4 (see Figs. 4 and 5), by leading the head 6 of the legs 5 around the coil of the spring 4 by means of a tool 9 disposed between the holders 3. In this manner, the legs 5 are formed to surrounding windings 8, which enclose the coil of the spring 4 closely.

The connecting device may be also of a shape different from that shown in Figs. 4 and 5, as for instance it may consist of S-shaped clamp bendings as shown in Fig. 8. In this embodiment, the spring wire 1' is equipped with a plurality of S- or Z-shaped projections spaced equally apart which comprise a leg portion 5' which over a head portion 6' leads to a second leg portion 5" which leads to an oppositely directed second head portion 6" and from there to a third leg portion 5''', the latter being connected with a bridge portion 10'.

The clamps 7' are formed from this pre-shaped connecting wire 1' by bending the head portions 6' and 6".

The bending plane for bending the mentioned head portions 6' and 6" crosses the leg portions 5' and 5''' at about a right angle, so that the plane extending through the formed clamp 7' is inclined to the longitudinal axis of the bridge portions 10'. It is quite clear that the leg portions 5', 5" and 5''' may be of any desired length. It is possible to provide such lengths for these leg portions, that upon closing the double clamp around the coils of the spring 4 (see Figs. 8 and 10) that a leg portion 11 still remains which is not wound around the coil of the spring 4 and which functions as a lever arm. By this arrangement, the individual springs may be disposed closer to each other and a turning rod effect is brought about in combination with the bridge portion 10'. In this manner, a tightly closed surface and also an increased elasticity of the mattress is achieved. It is to be understood that the relative position of the coil spring may be arranged in a different manner than that shown by example in the drawing.

In order to provide to the connection of a plurality of coil springs by means of a connecting wire, the following procedure will be followed:

At first, the coil springs 4 to be connected are disposed in a row. This is achieved by using a base plate 2 which is equipped with holders 3.

The spring wires are then arranged at a distance corresponding to the width of each coil spring 4 and are brought into engaging position with the springs 4 disposed in rows (Fig. 11), or vice versa, so that the connecting wire forms a common tangent to all coil springs disposed in one row.

Figure 13:
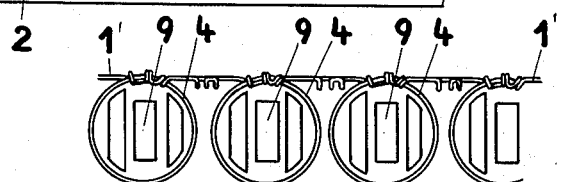
Fig. 13 is a plan view showing the connection of the connecting wire with the first row of springs.

Now, the connection between the connecting wire 1' and the coil of the spring 4 is brought about (Fig. 13). A second row of coil springs 4 is now arranged in such manner that each spring of the second row is disposed between each pair of adjacent springs of the first row and the coil springs 4 of the second row are brought into engaging position with the same connecting wire 1' connecting the first row of coil springs 4.

Figure 14:
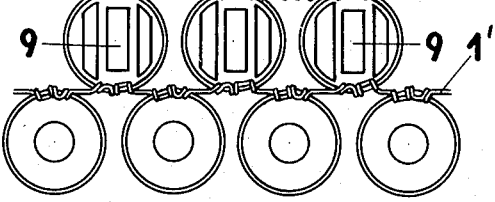
Fig. 14 is a plan view showing the connection of the connecting wire in accordance with the present invention with two rows of springs.
Figure 15:
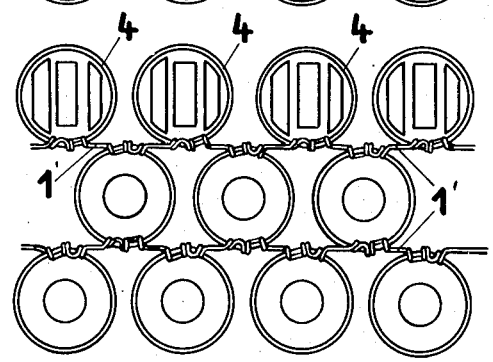
Fig. 15 is a plan view showing the connection of additional rows of springs with the connecting wire.

Then, a new connecting wire 1' is brought into engaging position on the free side of the second row of springs 4 and connected therewith (Fig. 14).

In the same manner, the next and each following row of springs 4 may be connected.

It is, of course, also possible to connect at first each of the rows of coil springs 4 with a connecting wire 1' and then engage the next row of coil springs 4 in proper relative position to the first row in order to connect each row of coil springs 4 with the adjacent row.

The thus formed spring assemblies are connected lengthwise as well as crosswise due to the connection of the coils of the springs 4 at diametrically opposite points and due to the bridges 10' formed by the connecting wires 1, so that a frameless assembly is formed. The bridges 10' of the spring wire 1' which connect the connecting point of one spring with the connecting point of the adjacent spring bring about an additional spring effect. Also, the bridges 10' transfer the load on one spring to adjacent springs and equalize the effect of the load on the spring assembly.

The bridges 10' extend preferably from the connecting point in such manner that they are removed from the spring coils upon exerting pressure on the spring by a load. This is achieved in the simplest manner by providing that the bridge 10' extends from the connecting point above the coil at the lower portion of the spring and below the coil at its upper portion. In this way, the known noise created by the springs upon subjecting them to a load experienced in known structures is completely avoided.

While I have disclosed several embodiments of the present invention, it is to be understood that these embodiments are given by example only and not in a limiting sense, the scope of the present invention being determined by the objects and the claims.

I claim:

1. In a spring assembly, the combination of a plurality of rows of cylindrical coil springs with the springs of adjacent coils in staggered relation, and connecting wires alternately connected to corresponding coils of said springs of adjacent rows in sequence, each of said connecting wires forming a plurality of double clamps spaced apart at a distance equivalent with that of each spring of one row from the staggered spring of the adjacent row, and one clamp of said double clamps being turned in opposite direction than the other clamp of said double clamps, thereby bringing about an interlocking of said connecting wire alternately with corresponding coils of said springs of two adjacent rows.

2. In a spring assembly, the combination of a plurality of rows of cylindrical coil springs with the springs of adjacent coils in staggered relation, and connecting wires alternately connected to corresponding coils of said springs of adjacent rows in sequence, each of said connecting wires forming a plurality of double clamps spaced apart at a distance equivalent with that of each spring of one row from the staggered spring of the adjacent row, and one clamp of said double clamps being turned in opposite direction than the other clamp of said double clamps, thereby bringing about an interlocking of said connecting wire alternately with corresponding coils of said springs of two adjacent rows, and said double clamps being disposed alternately in opposite directions toward the respective rows of said springs, and each of said double clamps being directed radially from the outside toward the corresponding coil of said springs at an angle corresponding with the angle of said corresponding coil with the longitudinal axis of said springs.

3. The spring assembly, as set forth in claim 2, in which each of said double clamps of the connecting wires has an uneven number of legs.

4. The spring assembly, as set forth in claim 2, in which each of said double clamps of the connecting wires has two outer and one intermediate legs and two bridge portions connecting said intermediate leg with said respective outer legs, and each of said outer legs being bent at about its center to U-shape and extending into lever-arms which terminate at about a right angle to the longitudinal axis of said connecting wires.

References Cited in the file of this patent

UNITED STATES PATENTS

| | | |
|---|---|---|
| 945,401 | Mack | Jan. 4, 1910 |
| 1,846,825 | Zimmerman | Feb. 23, 1932 |
| 1,854,503 | Dietrich | Apr. 19, 1932 |
| 1,860,699 | Zimmerman | May 31, 1932 |
| 2,330,244 | Saval | Sept. 28, 1943 |
| 2,420,512 | Woller | May 13, 1947 |